J. M. McMASTER.

Improvement in Setting Window-Glass.

No. 131,824. Patented Oct. 1, 1872.

Witnesses.
N. Campbell
T. A. Hitchcock

Inventor.
J. M. McMaster
By Hues. Loughborough
Atty

UNITED STATES PATENT OFFICE.

JOSEPH M. McMASTER, OF ROCHESTER, NEW YORK.

IMPROVEMENT IN SETTING WINDOW-GLASS.

Specification forming part of Letters Patent No. 131,824, dated October 1, 1872.

*To all whom it may concern:*

Be it known that I, JOSEPH M. MCMASTER, of Rochester, in the county of Monroe and State of New York, have invented certain Improvements in the Method of Packing or Setting Glass in Window-Sash, of which the following is a specification:

The object of my invention is to provide a cheap packing which shall take the place of putty in the attachment of window-glass to the sash; and it consists essentially in the employment of *papier maché*, or prepared water-proofed paper, molded into the desired form, and made in strips or into frames to suit the different-sized panes of glass.

Figure 1:
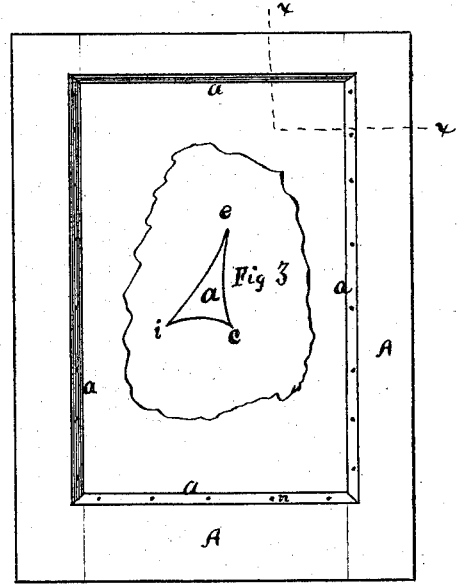
Figure 2:
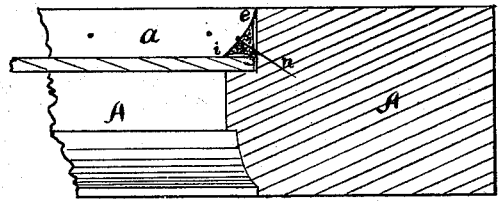

Figure 1 is an elevation of a one-lighted sash and glass having my invention attached. Fig. 2 is an enlarged sectional view taken in the direction of the dotted line $x$ in Fig. 1. Fig. 3 is an enlarged transverse section of the packing $a$.

When ordinary putty is used for setting glass the sash cannot be used until the putty has time to harden. I avoid this delay by the use of the prepared paper or *papier maché*.

This packing is prepared by being rolled, molded, or pressed into strips or into frames of corresponding sizes to suit the different-sized glass used. This packing should be made with its cross-section formed as shown the drawing. The thin edges $i$ and $e$ pack closely against the face of the glass and against the sash, and the edge $c$ packs against the edge of the glass and between it and the sash. It may be secured in place by the slim flat-headed nails $n$. There is sufficient elasticity in this packing to permit it to be drawn snugly against the glass by the nails without breaking it or injuring the packing.

What I claim as my invention is—

The prepared paper or *papier maché*, packing $a$, having its sides which are contiguous to the glass and to the sash made concave, as shown, so as to provide thin packing-edges $c$, $e$, and $i$, as and for the purposes set forth.

JOSEPH M. McMASTER.

Witnesses:
L. S. THOMPSON,
PATRICK MCINTYRE.